W. M. JACOBS.
SURVEYOR'S LEVEL.
APPLICATION FILED JULY 16, 1909.
994,521.
Patented June 6, 1911.
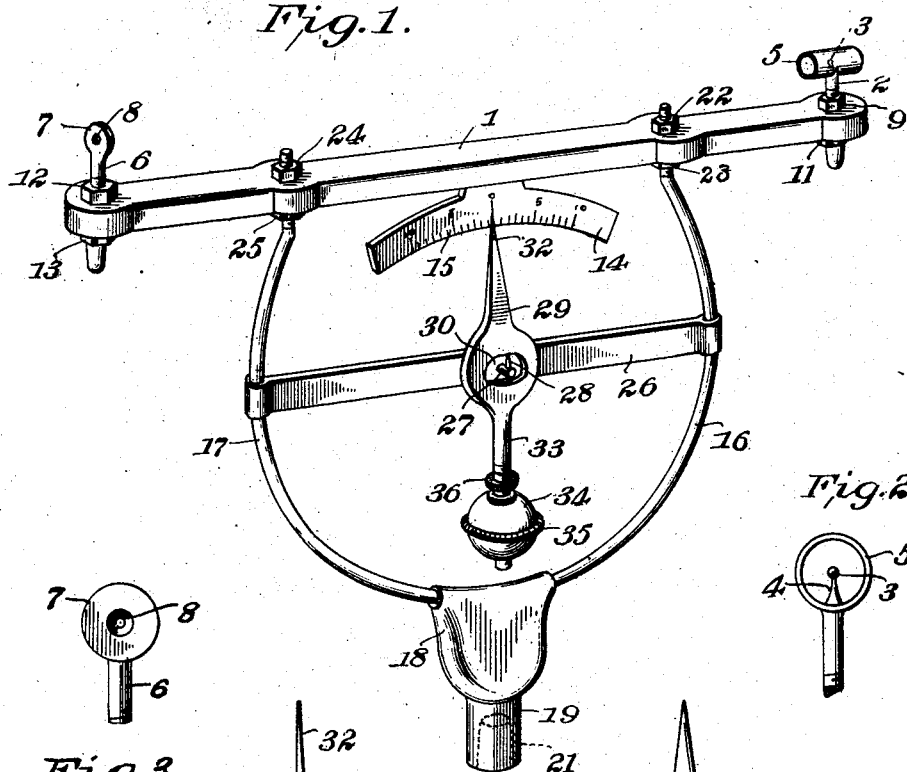
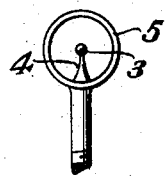
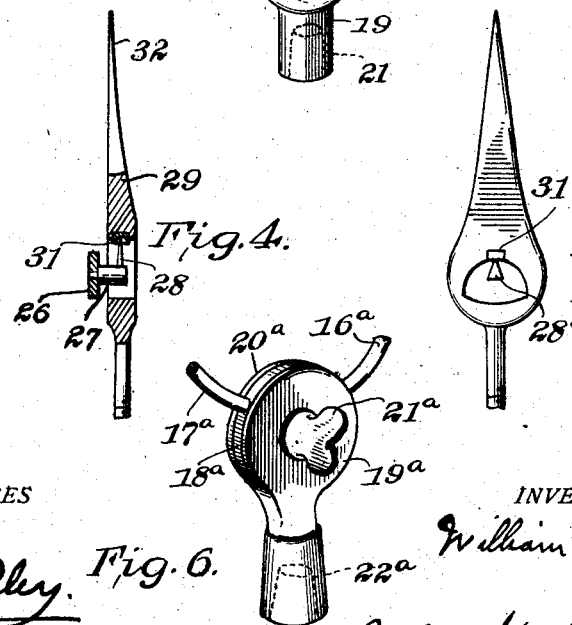
WITNESSES
J. A. Bishop
Ernest H. Riley
INVENTOR
William M. Jacobs
Attorney
Wilson Kent Ramsey

UNITED STATES PATENT OFFICE.

WILLIAM M. JACOBS, OF VALE, OREGON.

SURVEYOR'S LEVEL.

994,521. Specification of Letters Patent. Patented June 6, 1911.

Application filed July 16, 1909. Serial No. 508,075.

*To all whom it may concern:*

Be it known that I, WILLIAM M. JACOBS, a citizen of the United States, and a resident of Vale, county of Malhuer, State of Oregon, have invented certain new and useful Improvements in Surveyors' Levels, of which the following is a specification.

This invention relates broadly to surveying instruments and specifically to a simple surveying instrument for determining inclinations, grades, levels etc.

The object of this invention is to construct a strong, yet simple instrument, which may be subjected to rough or severe usage without great material damage to its construction.

A further object of the invention is to construct an instrument of the class described in such a manner that it may be easily adjusted should its calibration be disturbed.

A further object of the invention is to provide adjustments and mechanisms for varying the sensitiveness of the grade indicating mechanism.

As many different embodiments are possible in the construction of this device, without departing from the scope of the invention, I desire that the hereinafter specifically designated drawings which form a part of this specification, be considered as illustrative and not in a limiting sense.

Referring more particularly to the drawings in which like characters represent like parts throughout the several figures:—Figure 1 is a side elevation of the complete instrument. Fig. 2 is a detail of the front sight. Fig. 3 is a detail of the rear sight. Fig. 4 is a detail of the construction of the pivot for an inclinator needle. Fig. 5 is a modification of the inclinator needle pivot. Fig. 6 is a modification of the tripod socket head.

The instrument which forms the embodiment of this invention is useful as a grade indicating device, or for any purpose where it is desired to know the angle which any particular imaginary line or sight may make with a radius of the earth. And it is particularly useful in mining work, ditching, etc., where a delicate surveyor's instrument would soon be put out of commission by rought handling and rough usage.

Referring particularly to Fig. 1, a supporting bar 1, carries on one end a post 2, which terminates in a small ball-like sight 3, which is preferably constructed of ivory or a white metal such as German silver. The ball 3 being mounted upon a slender stem 4, is therefore liable to be broken, and for this reason it is surrounded by a small section of cylindrical tubing 5, which performs the double purpose of a sun-shade for the ball 3, and a protector to prevent the sight from being broken. The opposite end of the bar 1 carries a post 6, which is provided at its upper end with a disk 7. This disk is made with a small peep hole or sight 8. The peep sight 8 and the ivory ball 3 are adapted to be adjusted to equal distances above the surface of the bar 1. In order to facilitate this adjustment the stems 2 and 6 are threaded respectively, and are maintained in their positions on bar 1 by means of the nuts 9, 11, 12 and 13 respectively. The inclinator arc 14 is rigidly attached to the bar 1 at the middle portion of the arc and of the bar. The arc 14 carries thereon the scale 15.

Carrying rods 16 and 17 are permanently fastened into a head 18, which terminates in a shank 19, and is provided with an opening 21 which enables the shank to be attached to a carrying staff, of the type known as a Jacob's rod, or to a tripod, either of which may be used to support the instrument when in use. The upper ends of the rods 16 and 17 pass through openings in the bar 1, and are respectively threaded at their upper ends. The adjusting nuts 22, 23, permit the supporting bar 1 to be adjusted upon the rod 16, and adjusting nuts 24, 25, permit a like adjustment of bar 1 with respect to the rod 17. The cross brace or bar 26 is permanently attached to the rods 16 and 17, and carries at its center portion the supporting member 27 upon which is mounted a steel needle 28.

An inclinator needle 29 is provided with an opening 30, and carries a jeweled bearing 31, which is adapted to be placed upon the steel pin 28. The upper end of the inclinator needle terminates in a pointer 32 which coöperates with the scale 15 on the inclinator arc. The lower portion of the inclinator needle 29 is formed into a threaded rod 33 upon which is carried the weight 34. This weight is threaded to coöperate with the threads on the rod 33, and is provided with a knurled center bar 35, thus permitting a thumb-hold by means of which the weight 34 may be moved to various portions of the rod 33. The check nut 36, also carried upon the rod 33, effectually locks the weight 34 in any desired position. By adjusting the weight 34 with reference to the distance from the jewel bearing 31, the sensitiveness of the operation of the needle may be regulated to suit the desires of the user.

Referring particularly to Fig. 4, which is a detail showing a cross section through the inclinator needle and jewel bearing, bearing 31 is burnished into the needle body 29, and when the needle is in position it rests upon the steel pin 38, which is carried by the support 27. The bearing 31 may be made of sapphire, ruby or any other jewel which is adapted through its hardness and cheapness to be used as a bearing for scientific instruments, and is ground in a cup-shape, in order to form a proper seat for the needle 28.

It will be noted by reference to the structure hereinbefore described, that the inclinator needle 29 may be lifted from the steel pin 28 and carried in the pocket or any convenient place when the level is being moved from one position to another. This construction prevents the delicate pivot point of the needle 28 from being broken or damaged when the instrument is being transported.

Fig. 5 indicates a modification of the inclinator needle support. In this figure the jewel bearing 31$^a$ has its bearing surface concaved, and the steel support 28$^a$ is made in the form of a knife edge. This bearing permits the needle to swing in only one plane which is at right angles to the axis of the knife edge, and because of this limited motion of the needle it is particularly desirable for use in this particular instrument.

Fig. 6 shows a modification of the supporting head, which enables the user to incline the instrument without inclining the staff or support. In this modification rods 16$^a$ and 17$^a$ are permanently attached to a disk 18$^a$ which is carried between the clamping members 19$^a$ and 20$^a$. The thumb screw 21$^a$ passes through the members 19$^a$, 18$^a$ and is threaded into the member 20$^a$. Thus when the thumb screw 21$^a$ is tightened the disk 18$^a$ will be rigidly clamped between the members 19$^a$ and 20$^a$. The head terminates in a member 22$^a$ which is recessed to receive a supporting tripod or staff.

I desire it to be understood that I may use a telescope having cross hair therein, as well as the sights which I have shown in my drawings.

Having thus described my device I desire to claim as my invention:

1. In a device of the class described in combination, a supporting bar, a front sight, a rear sight, both of said sights being carried adjustably by said bar, an inclinator scale carried beneath said bar, an inclinator needle formed with an opening in substantially the middle thereof, means for removably supporting said inclinator needle, means for adjusting the sensitiveness of said needle, and means for adjusting the relationship of said needle with regard to said scale, substantially as described.

2. In a device of the class described in combination, a supporting bar, sights adjustably mounted upon said supporting bar, a head member, adjustable carrying means for said supporting bar mounted on said head member, a cross bar carried by said adjustable carrying means, a pivot mount attached to said cross bar, an inclinator needle formed with an opening in substantially the middle portion thereof, a bearing member mounted in said opening and adapted to coöperate with said pivot mount, said inclinator needle comprising a member formed with a pointer on one end thereof, and an adjustable weight on the end opposite said pointer, substantially as described.

3. In a device of the class described in combination, a supporting bar, sights adjustably mounted on said supporting bar, a head member, arc shaped carrying members connecting said head member and said supporting bar, adjustable connections between said arc shaped carrying members and said supporting bar, an inclinator scale mounted beneath said supporting bar, a cross bar connecting said arc shaped carrying members, a pivot member mounted on said cross bar at substantially the center upon which said arc shaped carrying members are curved, an inclinator needle provided with an opening at substantially the middle portion thereof, bearing means mounted in said opening of said needle, and means for adjusting the sensitiveness of said needle, substantially as described.

WILLIAM M. JACOBS.

Witnesses:
ERNEST F. RILERS,
GEO. W. RAMSEY.